J. G. MIELER.
Sleigh Runner.
No. 73,025.
Patented Jan. 7, 1868.
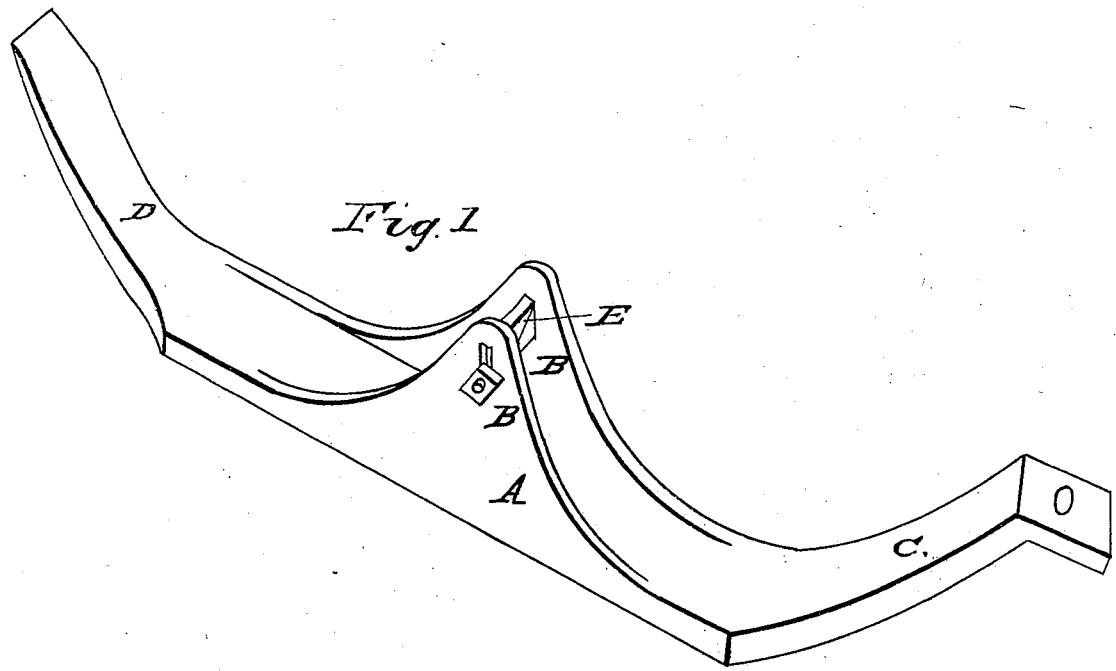
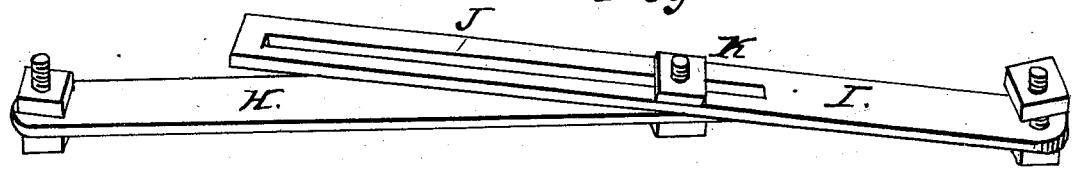
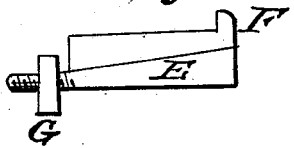

United States Patent Office.

JOHN G. MIELER, OF PLYMOUTH, MICHIGAN.

Letters Patent No. 73,025, dated January 7, 1868.

IMPROVEMENT IN SLEIGH-RUNNER.

The Schedule referred to in these Letters Patent and making part of the same.

TO WHOM IT MAY CONCERN:

Be it known that I, JOHN G. MIELER, of Plymouth, in the county of Wayne, and State of Michigan, have invented a new and useful Improvement in Sleigh-Runners, and their Attachments, to enable them to be used on wagons; and I do declare that the following is a true and accurate description thereof, reference being had to the accompanying drawings, and to the letters of reference marked thereon, and making a part of this specification.

Figure 1 is a view of my sleigh-runner.

Figure 2 is a view of the attachment.

The objects of this invention are to furnish an apparatus, at a very little expense, by which those desirous of using the same can obtain those parts necessary to transform a wagon into a sleigh with very little inconvenience, and at the same time keep the wagon in running order.

In order to do this, I make four metal runners A, provided with clips B, with the ends turning up, as at C D, and these ends fitted with proper holes to receive the necessary connecting-bolts. The clips B are also fitted with necessary holes to receive two keys, E, one of them provided with a gib-head, F, and the other with a screw and nut, G. The rear runners are made precisely like the front runners, except that the rear ends need not turn up so high, only just high enough to allow the vehicle to be readily "backed up," and should not be fitted with both holes.

To use my invention, it is only necessary to place one of my runners under each wheel of the wagon, and, by means of the clips and wedges, fasten it securely to the felloe of the wheel. Then connect the front and rear runners together by my attachment, which I will now describe.

To construct this attachment I use two iron straps, H and I, provided at their outer ends with proper bolts and nuts, to fasten to the rear end of the front runners and the front end of the rear runners. Through the strap H, I put an adjusting-bolt, K, which also passes through and works in the slot J in the strap I. By this means the distance between the runners can be regulated, and at the same time the adjusting-bolt allows the vehicle to turn in any direction that may be desired.

Figure 3 is a view of the keys, one with gib-head, and the other with nut and screw.

What I claim as my invention, and desire to secure by Letters Patent, is—

1. The construction of metal runners, of the shape set forth, provided with clips B, and provided with means of connection, substantially as described, and for the purposes set forth.

2. The attachment, constructed from iron straps H and I, provided with the adjusting-bolt K and the slot J, operating substantially as and for the purpose described.

3. The combination of the above-described runners and attachments, when constructed substantially in the manner described.

JOHN G. MIELER.

Witnesses:
GEORGE RUHLANDT,
R. W. JOHNSON.